(12) United States Patent
Kim et al.

(10) Patent No.: US 11,043,036 B2
(45) Date of Patent: Jun. 22, 2021

(54) ARTIFICIAL INTELLIGENCE ENHANCED SYSTEM FOR ADAPTIVE CONTROL DRIVEN AR/VR VISUAL AIDS

(71) Applicant: EYEDAPTIC, INC., Laguna Niguel, CA (US)

(72) Inventors: Brian Kim, San Clemente, CA (US); David A. Watola, Irvine, CA (US); Jay E. Cormier, Laguna Niguel, CA (US)

(73) Assignee: EYEDAPTIC, INC., Laguna Niguel, CA (US)

( * ) Notice: Subject to any disclaimer, the term of this patent is extended or adjusted under 35 U.S.C. 154(b) by 0 days.

(21) Appl. No.: 16/727,564

(22) Filed: Dec. 26, 2019

(65) Prior Publication Data

US 2020/0134926 A1 Apr. 30, 2020

Related U.S. Application Data

(63) Continuation of application No. 16/030,788, filed on Jul. 9, 2018, now abandoned.
(Continued)

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/012* (2013.01); *G06F 3/013* (2013.01); *G06F 3/167* (2013.01);
(Continued)

(58) Field of Classification Search
CPC combination set(s) only.
See application file for complete search history.

(56) References Cited

U.S. PATENT DOCUMENTS 5,546,099 A * 8/1996 Quint ................. G02B 27/0172
128/857
5,777,715 A 7/1998 Kruegle et al.
(Continued)

FOREIGN PATENT DOCUMENTS

CA 2916780 A1 10/2008
CA 164180 S 9/2016
(Continued)

OTHER PUBLICATIONS

Carroll et al.; Visual field testing:from one medical student to another; 18 pages; retrieved from the internet (http://eyerounds.org/tutorials/VF-testing/); Aug. 22, 2013.
(Continued)

*Primary Examiner* — Andrew G Yang
(74) *Attorney, Agent, or Firm* — Shay Glenn LLP

(57) ABSTRACT

Interactive systems using adaptive control software and hardware from known and later developed eyepieces to later developed head-wear to lenses, including implantable, temporarily insertable and contact and related film based types of lenses including thin film transparent elements for housing cameras lenses and projector and functional equivalent processing tools. Simple controls, real-time updates and instant feedback allow implicit optimization of a universal model while managing complexity.

12 Claims, 3 Drawing Sheets

Related U.S. Application Data

(60) Provisional application No. 62/530,286, filed on Jul. 9, 2017, provisional application No. 62/530,792, filed on Jul. 10, 2017.

(51) Int. Cl.
  G06F 3/16      (2006.01)
  G06N 5/04      (2006.01)
  G06F 9/451      (2018.01)
  G06N 3/00       (2006.01)
  G06N 20/00      (2019.01)

(52) U.S. Cl.
  CPC ............. G06N 5/04 (2013.01); *G06F 9/453* (2018.02); *G06N 3/006* (2013.01); *G06N 20/00* (2019.01)

(56) References Cited

U.S. PATENT DOCUMENTS

| | | |
|---|---|---|
| 5,892,570 A | 4/1999 | Stevens |
| 8,384,999 B1 | 2/2013 | Crosby et al. |
| 8,976,086 B2 | 3/2015 | Hilkes |
| 9,516,283 B2 | 12/2016 | Hilkes et al. |
| 9,782,084 B2 | 10/2017 | Maertz |
| 10,429,675 B2 | 10/2019 | Greget |
| 10,564,714 B2 | 2/2020 | Marggraff et al. |
| 2007/0200927 A1 | 8/2007 | Krenik |
| 2008/0013047 A1 | 1/2008 | Todd et al. |
| 2008/0186586 A1* | 8/2008 | Yamamoto ......... G02B 27/0176 359/630 |
| 2008/0247620 A1 | 10/2008 | Lewis et al. |
| 2008/0309878 A1 | 12/2008 | Hirji |
| 2011/0043644 A1 | 2/2011 | Munger et al. |
| 2011/0109876 A1 | 5/2011 | Reichow et al. |
| 2011/0181692 A1 | 7/2011 | Kuno |
| 2011/0285960 A1 | 11/2011 | Kohn et al. |
| 2012/0206452 A1 | 8/2012 | Geisner et al. |
| 2012/0242865 A1 | 9/2012 | Vartanian et al. |
| 2012/0309529 A1 | 12/2012 | Westlund et al. |
| 2013/0215147 A1 | 8/2013 | Hilkes et al. |
| 2014/0063062 A1 | 3/2014 | Fateh |
| 2014/0210970 A1 | 7/2014 | Dalal et al. |
| 2015/0002808 A1 | 1/2015 | Rizzo, III et al. |
| 2015/0355481 A1 | 12/2015 | Hilkes et al. |
| 2016/0033771 A1* | 2/2016 | Tremblay .............. G02B 26/10 345/8 |
| 2016/0041615 A1* | 2/2016 | Ikeda ..................... G06T 1/00 345/156 |
| 2016/0085302 A1 | 3/2016 | Publicover et al. |
| 2016/0116979 A1 | 4/2016 | Border |
| 2016/0156850 A1 | 6/2016 | Werblin et al. |
| 2016/0171779 A1 | 6/2016 | Bar-Zeev et al. |
| 2016/0178912 A1* | 6/2016 | Kusuda .............. G02B 27/0176 359/630 |
| 2016/0187969 A1 | 6/2016 | Larsen et al. |
| 2016/0216515 A1 | 7/2016 | Bouchier et al. |
| 2016/0235291 A1 | 8/2016 | Goh et al. |
| 2016/0264051 A1 | 9/2016 | Werblin |
| 2016/0270648 A1 | 9/2016 | Freemen et al. |
| 2016/0270656 A1 | 9/2016 | Samec et al. |
| 2016/0314564 A1 | 10/2016 | Jones et al. |
| 2016/0349509 A1 | 12/2016 | Lanier et al. |
| 2017/0185723 A1 | 6/2017 | McCallum et al. |
| 2017/0200296 A1 | 7/2017 | Jones et al. |
| 2017/0221264 A1 | 8/2017 | Perry |
| 2017/0249862 A1* | 8/2017 | Border .................. H04N 7/183 |
| 2017/0273552 A1* | 9/2017 | Leung .................. H04N 13/366 |
| 2018/0104106 A1* | 4/2018 | Lee ........................... A61F 9/08 |
| 2018/0144554 A1 | 5/2018 | Watola et al. |
| 2018/0203231 A1* | 7/2018 | Glik ................... G02B 27/0103 |
| 2018/0217380 A1* | 8/2018 | Nishimaki ......... G02B 27/0176 |
| 2018/0249151 A1 | 8/2018 | Freeman et al. |
| 2018/0365877 A1 | 12/2018 | Watola et al. |
| 2019/0012841 A1 | 1/2019 | Kim et al. |
| 2019/0180421 A1 | 6/2019 | Kim et al. |
| 2019/0279407 A1 | 9/2019 | McHugh et al. |
| 2019/0281211 A1 | 9/2019 | Watola et al. |
| 2019/0331920 A1 | 10/2019 | Watola et al. |
| 2019/0339528 A1 | 11/2019 | Freeman et al. |
| 2019/0385342 A1 | 12/2019 | Freeman et al. |
| 2021/0022599 A1 | 1/2021 | Freeman et al. |

FOREIGN PATENT DOCUMENTS

| | | |
|---|---|---|
| EP | 2674805 A2 | 12/2013 |
| WO | WO2008/119187 A1 | 10/2008 |
| WO | WO2011/060525 A1 | 5/2011 |
| WO | WO2013/120180 A1 | 8/2013 |
| WO | WO2013/177654 A1 | 12/2013 |
| WO | WO2014/107261 A1 | 7/2014 |
| WO | WO2016/036860 A1 | 3/2016 |
| WO | WO2016/077343 A1 | 5/2016 |
| WO | WO2016/144419 A1 | 9/2016 |
| WO | WO2016/149536 A1 | 9/2016 |
| WO | WO2016/168913 A1 | 10/2016 |
| WO | WO2017/059522 A1 | 4/2017 |
| WO | WO2018/200717 A1 | 11/2018 |
| WO | WO2019/232082 A1 | 12/2019 |
| WO | WO2020/014705 A1 | 1/2020 |
| WO | WO2020/014707 A1 | 1/2020 |
| WO | WO2021/003406 A1 | 1/2021 |

OTHER PUBLICATIONS

Unser et al.; B-spline signal processing: Part II—efficient design and applicationtions; IEEE Transactions on Signal Processing; 41(2); pp. 834-848; Feb. 1993.

Unser et al.; B-spline signal processing: part I—theory; IEEE Transactions on Signal Processing; 41(2)); pp. 821-832; Feb. 1993.

Unser et al.; TheL2 polynomial spline pyramid; IEEE Transactions on Pattern Analysis and Machine Intelligence; 15(4); pp. 364-379; Apr. 1993.

Unser; Splines—a perfect fit for signal and image processing; IEEE Signal Processing Magazine; 16 (Article); pp. 22-38; Nov. 1999.

Watola et al.; U.S. Appl. No. 16/789,237 entitled "Systems for augmentd reality visual aids and tools," filed Feb. 12, 2020.

Gonzalez; Advanced Imaging in Head-Mounted Displays for Patients with Age-Related Macular Degeneration; Doctoral dissertation; Technical University of Munich; p. 1-129; (year of pub. sufficiently earlier than effective US filing date and any foreign priority date) 2011.

Watola et al.; U.S. Appl. No. 17/057,181 entitled "Hybrid see through augmented realty systems and methods for low vision users," filed Nov. 20, 2020.

Watola et al.; U.S. Appl. No. 17/129,628 entitled "Systems for augmented reality visual aids and tools," filed Dec. 21, 2020.

* cited by examiner

FIG. 3A
FIG. 3B
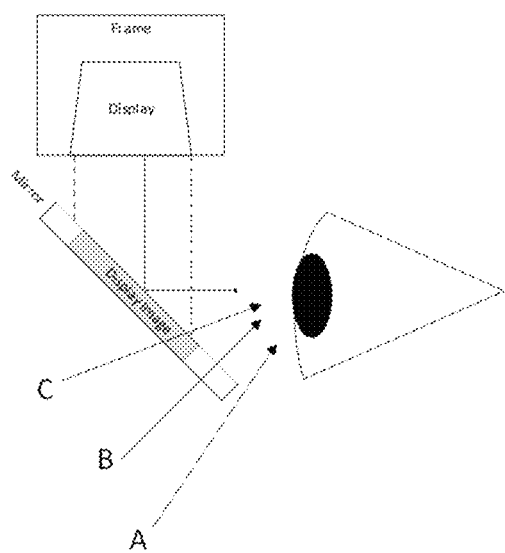
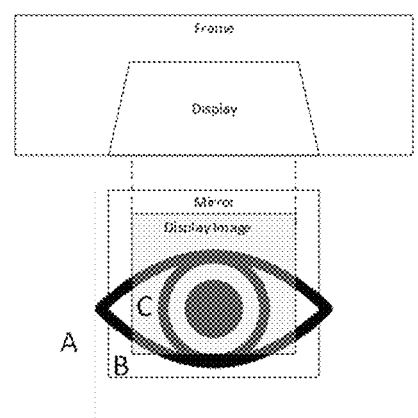

ARTIFICIAL INTELLIGENCE ENHANCED SYSTEM FOR ADAPTIVE CONTROL DRIVEN AR/VR VISUAL AIDS

CROSS REFERENCE TO RELATED APPLICATIONS

This application is a continuation of U.S. patent application Ser. No. 16/030,788, filed Jul. 9, 2018, which application claims the benefit of and priority to U.S. Provisional Patent Application Nos. 62/530,286 and 62/530,792, filed July 2017, the content of each of which is incorporated herein by reference herein in its entirely, along with full reservation of all Paris convention rights.

BACKGROUND OF THE DISCLOSURES

The Interactive Augmented Reality (AR) Visual Aid invention described below is intended for users with visual impairments that impact field of vision (FOV). These may take the form of age-related macular degeneration, retinitis pigmentosa, diabetic retinopathy, Stargardt's disease, and other diseases where damage to part of the retina impairs vision. The invention described is novel because it not only supplies algorithms to enhance vision, but also provides simple but powerful controls and a structured process that allows the user to adjust those algorithms.

OBJECTS AND SUMMARY OF THE INVENTION

The basic hardware is constructed from a non-invasive, wearable electronics-based AR eyeglass system (see FIG. 2) employing any of a variety of integrated display technologies, including LCD, OLED, or direct retinal projection. One or more cameras, mounted on the glasses, continuously monitor the view where the glasses are pointing. The AR system also contains an integrated processor and memory storage (either embedded in the glasses, or tethered by a cable) with embedded software implementing real-time algorithms that modify the images as they are captured by the camera(s). These modified, or corrected, images are then continuously presented to the eyes of the user via the integrated displays.

The basic image modification algorithms come in multiple forms as described later. In conjunction with the AR hardware glasses, they enable users to enhance vision in ways extending far beyond simple image changes such as magnification or contrast enhancement. The fundamental invention is a series of adjustments that are applied to move, modify, or reshape the image in order to reconstruct it to suit each specific user's FOV and take full advantage of the remaining useful retinal area. The following disclosure describes a variety of mapping, warping, distorting and scaling functions used to correct the image for the end user.

The invention places these fundamental algorithms under human control, allowing the user to interact directly with the corrected image and tailor its appearance for their particular condition or specific use case. In prior art, an accurate map of the usable user FOV is a required starting point that must be known in order to provide a template for modifying the visible image. With this disclosure, such a detailed starting point derived from FOV measurements does not have to be supplied. Instead, an internal model of the FOV is developed, beginning with the display of a generic template or a shape that is believed to roughly match the type of visual impairment of the user. From this simple starting point the user adjusts the shape and size of the displayed visual abnormality, using the simple control interface to add detail progressively, until the user can visually confirm that the displayed model captures the nuances of his or her personal visual field. Using this unique method, accurate FOV tests and initial templates are not required. Furthermore, the structured process, which incrementally increases model detail, makes the choice of initial model non-critical.

For people with retinal diseases, adapting to loss a vision becomes a way of life. This impact can affect their life in many ways including loss of the ability to read, loss of income, loss of mobility and an overall degraded quality of life. However, with prevalent retinal diseases such as AMD (Age related Macular Degeneration) not all of the vision is lost, and in this case the peripheral vision remains intact as only the central vision is impacted with the degradation of the macula. Given that the peripheral vision remains intact it is possible to take advantage of eccentric viewing and through patient adaptation to increase functionality such as reading. Research has proven that through training of the eccentric viewing increased reading ability (both accuracy and speed). Eye movement control training and PRL (Preferred Retinal Locus) training were important to achieving these results. Another factor in increasing reading ability with those with reduced vision is the ability to views words in context as opposed to isolation. Magnification is often used as a simply visual aid with some success. However, with increased magnification comes decreased FOV (Field of View) and therefore the lack of ability to see other words or objects around the word or object of interest. Although it was proven that with extensive training isolated word reading can improve, eye control was important to this as well. The capability to guide the training for eccentric viewing and eye movement and fixation training is important to achieve the improvement in functionality such as reading. These approaches outlined below will serve to both describe novel ways to use augmented reality techniques to both automate and improve the training.

In order to help users with retinal diseases, especially users with central vision deficiencies. First it is important to train and help their ability to fixate on a target. Since central vision is normally used for this, this is an important step to help users control their ability to focus on a target. Thereby laying the ground work for more training and adaptation functionality. This fixation training can be accomplished through gamification built into the software algorithms, and can be utilized periodically for increased fixation training and improved adaptation. The gamification can be accomplished by following fixation targets around the display screen and in conjunction with a hand held pointer can select or click on the target during timed or untimed exercise. Furthermore, this can be accomplished through voice active controls as a substitute or adjunct to a hand help pointer.

To aid the user in targeting and fixation certain guide lines can be overlaid on reality or on the incoming image to help guide the users eye movements along the optimal path. These guidelines can be a plurality of constructs such as, but not limited to, cross hair targets, bullseye targets or linear guidelines such as singular or parallel dotted lines of a fixed or variable distance apart, a dotted line or solid box of varying colors. This will enable the user to increase their training and adaptation for eye movement control to following the tracking lines or targets as their eyes move across a scene in the case of a landscape, picture or video monitor or across a page in the case of reading text.

This approach can be further modified and improved with other interactive methods beyond simple eye movement.

Targeting approaches as described above can also be tied to head movement based on inertial sensor inputs or simply following along as the head moves. Furthermore, these guided fixation targets, or lines, can move across the screen at a predetermined fixed rate to encourage the user to follow along and keep pace. These same targets can also be scrolled across the screen at variable rates as determined or triggered by the user for customization to the situation or scene or text of interest.

To make the most of a user's remaining useful vision methods for adaptive peripheral vision training can be employed. Training and encouraging the user to make the most of their eccentric viewing capabilities is important. As described the user may naturally gravitate to their PRL (preferred retinal locus) to help optimized their eccentric viewing. However, this may not be the optimal location to maximize their ability to view images or text with their peripheral vision. Through use of skewing and warping the images presented to the user, along with the targeting guidelines it can be determined where the optimal place for the user to target their eccentric vision.

Eccentric viewing training through reinforced learning can be encouraged by a series of exercises. The targeting as described in fixation training can also be used for this training. With fixation targets on and the object, area, or word of interest can be incrementally tested by shifting locations to determine the best PRL for eccentric viewing.

Also, pupil tracking algorithms can be employed and not only have eye tracking capability but can also utilize user customized offset for improved eccentric viewing capability. Whereby the eccentric viewing targets are offset guide the user to focus on their optimal area for eccentric viewing.

Further improvements in visual adaptation can be achieved through use of the hybrid distortion algorithms. With the layered distortion approach objects or words on the outskirts of the image can receive a different distortion and provide a look ahead preview to piece together words for increased reading speed. While the user is focused on the area of interest that is being manipulated the words that are moving into the focus area can help to provide context in order to interpolate and better understand what is coming for faster comprehension and contextual understanding.

Furthermore, the user can be run through a series of practice modules whereby different distortion levels and methods are employed. With these different methods hybrid distortion training can be used to switch between areas of interest to improve fixation.

BRIEF DESCRIPTION OF THE DRAWINGS

Various preferred embodiments are described herein with references to the drawings in which merely illustrative views are offered for consideration, whereby:

FIGS. 3A-3B depict front and side views of one eye within a set of notional OST AR glasses employing a half-silvered mirror to combine incoming scene light with the image shown on an internally-mounted display.

Figure 1:
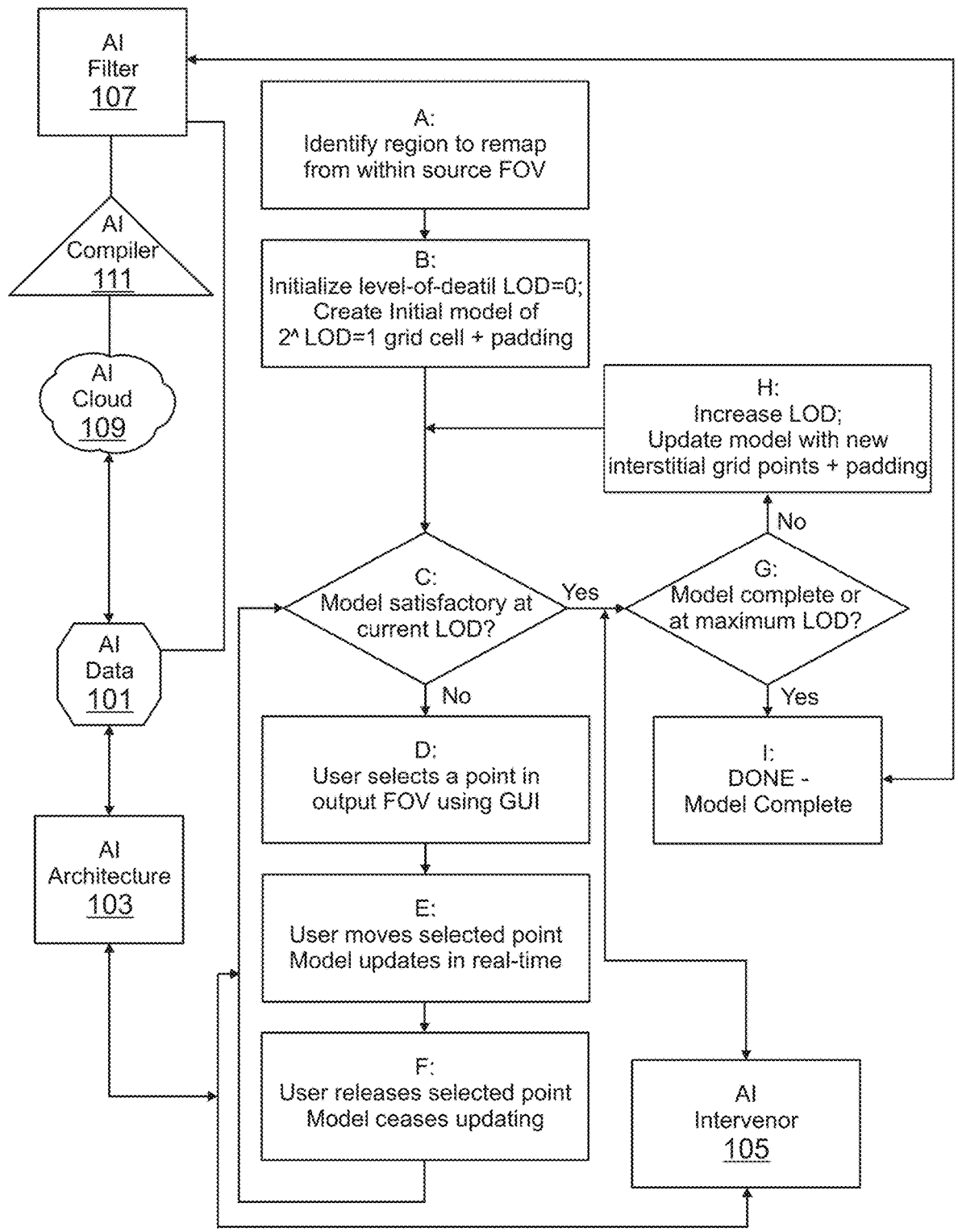
FIG. 1 is a grid manipulation flowchart, including hierarchical model construction.
Figure 2:
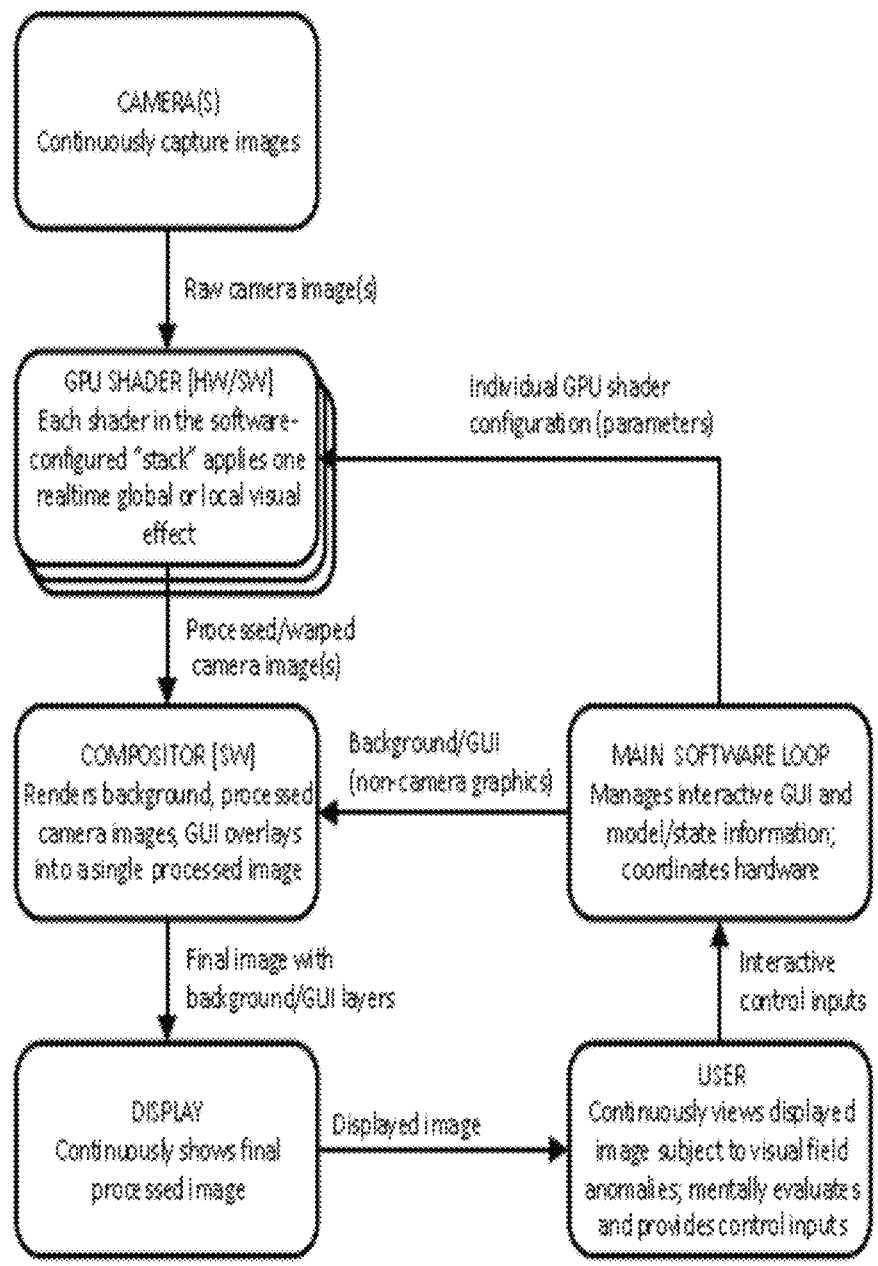
FIG. 2 is a flowchart of an eyeglass system that continuously presents modified images to the eyes of a user.

Corresponding reference characters indicate corresponding components are not needed throughout the single view of the drawing. Skilled artisans will appreciate that elements in the figures are illustrated for simplicity and clarity, and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTIONS

The present inventors have discovered that low-vision users can conform a user-tuned software set and improve needed aspects of vision to enable functional vision to be restored.

Expressly incorporated by reference as if fully set forth herein are the following: U.S. Provisional Patent Application No. 62/530,286 filed Jul. 9, 2017, U.S. Provisional Patent Application No. 62/530,792 filed Jul. 9, 2017, U.S. Provisional Patent Application No. 62/579,657, filed Oct. 13, 2017, U.S. Provisional Patent Application No. 62/579,798, filed Oct. 13, 2017, Patent Cooperation Treaty Patent Application No. PCT/US2017/062421, filed Nov. 17, 2017, U.S. patent application Ser. No. 15/817,117, filed Nov. 17, 2017, U.S. Provisional Patent Application No. 62/639,347, filed Mar. 6, 2018, U.S. patent application Ser. No. 15/918,884, filed Mar. 12, 2018, and U.S. Provisional Patent Application No. 62/677,463, filed May 29, 2018.

It is contemplated that the processes described above are implemented in a system configured to present an image to the user. The processes may be implemented in software, such as machine readable code or machine executable code that is stored on a memory and executed by a processor. Input signals or data is received by the unit from a user, cameras, detectors or any other device. Output is presented to the user in any manner, including a screen display or headset display In addition, the logic flows depicted in the figures do not require the particular order shown, or sequential order, to achieve desirable results. Furthermore, other steps may be provided or steps may be eliminated from the described flows, and other components may be added to, or removed from, the described systems. Accordingly, other embodiments are within the scope of the following claims.

Referring now to FIG. 1, systems of the present invention are shown schematically. Steps A-I are enhanced by the various interfaces and loops connecting AI interfaces with the instant system, as is known to those of skill in the art.

AI Data 101, resides both in its own database and in an AI cloud 109, along with AI Compiler 111, and AI filter 107 along with any other required AI architecture 103 and AI Intervenor 105. Step A involves identifying region(s) to remap from with source FOV; Step B initializing the same to achieve Step C wherein the model created is ratified.

AI Architecture 103 provides both resident and transient data sets to address the issue(s) being ameliorated in the user's vision. Said data sets reside in at least one of the sub-elements of the AI architecture, namely AI cloud 109, AI compiler 111, AI filter 107 and AI intervenor 105, as known to those skilled in the art. Likewise, Step D wherein user selects point outputs, and step E wherein user moves selected point(s) updating models in real-time, and Step F, wherein user releases selected point(s), along with step G wherein interlocutory model is deemed complete, or H needing updates or I complete. Those skilled in the art understand the multi-path approach and orientation to use AI elements to create functional and important models using said data, inter alia.

It will be appreciated that the above embodiments that have been described in particular detail are merely example or possible embodiments, and that there are many other combinations, additions, or alternatives that may be included. For example, while online gaming has been referred to throughout, other applications of the above embodiments include online or web-based applications or other cloud services.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of the above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or calculating" or "determining" or "identifying" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

As one skilled in the art would recognize as necessary or best-suited for performance of the methods of the invention, a computer system or machines of the invention include one or more processors (e.g., a central processing unit (CPU) a graphics processing unit (GPU) or both), a main memory and a static memory, which communicate with each other via a bus.

A processor may be provided by one or more processors including, for example, one or more of a single core or multi-core processor (e.g., AMD Phenom II X2, Intel Core Duo, AMD Phenom II X4, Intel Core i5, Intel Core I & Extreme Edition 980X, or Intel Xeon E7-2820).

An I/O mechanism may include a video display unit (e.g., a liquid crystal display (LCD) or a cathode ray tube (CRT)), an alphanumeric input device (e.g., a keyboard), a cursor control device (e.g., a mouse), a disk drive unit, a signal generation device (e.g., a speaker), an accelerometer, a microphone, a cellular radio frequency antenna, and a network interface device (e.g., a network interface card (NIC), Wi-Fi card, cellular modem, data jack, Ethernet port, modem jack, HDMI port, mini-HDMI port, USB port), touchscreen (e.g., CRT, LCD, LED, AMOLED, Super AMOLED), pointing device, trackpad, light (e.g., LED), light/image projection device, or a combination thereof.

Memory according to the invention refers to a non-transitory memory which is provided by one or more tangible devices which preferably include one or more machine-readable medium on which is stored one or more sets of instructions (e.g., software) embodying any one or more of the methodologies or functions described herein. The software may also reside, completely or at least partially, within the main memory, processor, or both during execution thereof by a computer within system, the main memory and the processor also constituting machine-readable media. The software may further be transmitted or received over a network via the network interface device.

While the machine-readable medium can in an exemplary embodiment be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. Memory may be, for example, one or more of a hard disk drive, solid state drive (SSD), an optical disc, flash memory, zip disk, tape drive, "cloud" storage location, or a combination thereof. In certain embodiments, a device of the invention includes a tangible, non-transitory computer readable medium for memory. Exemplary devices for use as memory include semiconductor memory devices, (e.g., EPROM, EEPROM, solid state drive (SSD), and flash memory devices e.g., SD, micro SD, SDXC, SDIO, SDHC cards); magnetic disks, (e.g., internal hard disks or removable disks); and optical disks (e.g., CD and DVD disks).

Furthermore, numerous references have been made to patents and printed publications throughout this specification. Each of the above-cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

Augmented Reality—VST vs. OST.

Augmented Reality (AR) eyewear implementations fall cleanly into two disjoint categories, video see-through (VST) and optical see-through (OST).

Apparatus for VST AR closely resembles Virtual Reality (VR) gear, where the wearer's eyes are fully enclosed so that only content directly shown on the embedded display remains visible. VR systems maintain a fully-synthetic three-dimensional environment that must be continuously updated and rendered at tremendous computational cost. In contrast, VST AR instead presents imagery based on the real-time video feed from an appropriately-mounted camera (or cameras) directed along the user's eyeline; hence the data and problem domain are fundamentally two-dimensional. VST AR provides absolute control over the final appearance of visual stimulus, and facilitates registration and synchronization of captured video with any synthetic augmentations. Very wide fields-of-view (FOV) approximating natural human limits are also achievable at low cost. However, VST gear tends to be bulky and incur additional latencies associated with image capture.

OST AR eyewear, on the other hand, has a direct optical path allowing light from the scene to form a natural image on the retina. This natural image is essentially the same one that would be formed without AR glasses, possibly with some loss of brightness due to attenuation by the combining optics. A camera is used to capture the scene for automated analysis, but its image does not need to be shown to the user. Instead, computed annotations or drawings from an internal display are superimposed onto the natural retinal image by (e.g.) direct laser projection or a half-silvered mirror for optical combining. In a traditional OST AR application, the majority of the display typically remains blank (i.e., black) to avoid contributing any photons to the final retinal image; displayed augmentations produce sufficient light to be visible against this background. The horizontal field-of-view over which annotations can be projected tends to be limited to a central 25 to 50 degrees, but there is no delay between real-world events and their perception. Furthermore, the scene image has no artifacts due to image-sensor sampling, capture, or processing. However, synchronizing augmentations becomes more challenging and user-dependent calibration may be needed to ensure proper their registration. Finally, OST possesses an inherent degree of safety that VST lacks: if the OST hardware fails, the user can still see the environment.

Augmented Reality and Low Vision.

The primary task of visual-assistance eyewear for low-vision sufferers does not match the most common use model for AR (whether VST or OST), which involves superimposing annotations or drawings on a background image that is otherwise faithful to the reality seen by the unaided eye. Instead, assistive devices need to dramatically change how the environment is displayed in order to compensate defects in the user's vision. Processing may include contrast enhancement and color mapping, but invariably incorporates increased magnification to counteract deficient visual acuity. Existing devices for low-vision are magnification-centric, and hence operate in the VST regime with VST hardware. Some alternative methods employ an OST-based AR platform, but install opaque lens covers that completely block all environmental light from entering the retina—since a camera supplies the only visible image via an internal display, it is exclusively a VST system.

Hybrid See-Through.

This methodology describes an AR platform that is nominally OST for its development effort, but employs a unique combined VST/OST methodology (hybrid see-through, or HST) to produce its final retinal image. Doing so permits the best characteristics of each technique to be effectively exploited while simultaneously avoiding or ameliorating undesirable aspects. Specifically:

The wide field of view associated with VST can be maintained for the user in spite of the narrow active display area of the OST-based glasses;

Absolute control over the final retinal image details is achieved (as in VST) for the highest-acuity central area covered by the internal display;

A fail-safe vision path exists at all times (as in OST), regardless of the content of the internal display—and whether or not that display is functioning;

A recently-identified need specific to low-vision is addressed and remedied.

There are three aspects to HST implementation that together engender its effectiveness: spatial partitioning, tailored image processing, and elimination of focus ambiguity.

Spatial Partitioning.

There are typically three types of viewing in a HST AR system, corresponding to three characteristically distinct paths for OST AR light rays as they travel from a viewed scene into an eye and onto its retina. Only two types are fundamentally different, but it is convenient for the purposes of this document to distinguish the third.

Consider the drawings in FIGS. 3A-3B, which depict front and side views of one eye within a set of notional OST AR glasses employing a half-silvered mirror to combine incoming scene light with the image shown on an internally-mounted display. In this example, the display is mounted in the top frame of the glasses and points downward such that the mirror directs its reflected image into the eye; the same mirror allows light from the environment to pass directly through it into the eye. Other mounting orientations and optical combining strategies exist, but this one adequately illustrates the three relevant types of light paths for all of them.

In both drawings, labels A, B, & C represent light rays originating in an environmental scene, directed toward the eye and travelling through the pupil and onto the retina. Label A indicates light that travels directly from the scene to the retina without intersecting any non-trivial lenses or mirrors. Labels B and C denote light that travels from the scene and into the retina, but only after passing through the combining mirror.

The difference between the two is that C intersects the region of the mirror where the internal display also projects its output. Light from this display does not interact with scene light at the combiner, so there is no intrinsic difference between types B and C other than this simple fact of geometry. However, the importance of the distinction is clarified immediately below:

Type A. For portions of the field-of-view that are not within range of the internal display (and also not completely or partially blocked by half-silvered mirrors or other optics, a direct and natural light path from the scene to the retina exists. This OST path cannot actively participate in AR since the display cannot affect its retinal image, but its existence preserves the user's existing peripheral vision and maintains a fail-safe degree of visual capability regardless of what the internal display is showing.

Type B. For portions of the field-of-view that intersect the combining mirror but do not overlap the projected internal display, there may be some loss of brightness due to attenuation as light rays of type B pass through the combining optics. Type B rays are otherwise identical to light of type A, and can provide significant OST peripheral vision above and below the internal display image.

Type C. In a traditional AR application these light rays, which intersect the projection of the internal display onto the mirror, would be blended on the retina with the image presented on the display. In HST, however, this combining process—which is the very essence of OST AR—is deliberately prevented by blocking type C light so that the central visual field comprises only content originating in the display. Thus a defining paradigm is subverted, and OST eyewear locally takes on characteristics of VST.

It is important to note that blocking type C rays is not an obvious choice to make. OST AR displays are typically capable of providing light power sufficient to overwhelm the direct scene image on retina, causing the brain to perceive only the dominant image. The additional utility granted by blocking type C light will be described in a later section.

It is the partitioning of angular space into explicit OST and VST regions that lends HST its name. The remaining two aspects serve to amplify its utility.

Tailored Image Processing.

In HST ASR, the image provided by the internal OST display replaces the natural retinal image that would normally be produced by type C light rays. Like VST AR display content, it is derived in real-time from an eyewear-mounted camera video stream with additional processing applied. However, OST displays have a much narrower field of view than their VST cousins, so more sophisticated computation is needed to provide utility.

The specific processing used with HST is described earlier and not considered in detail here. Relevant features for the present discussion are:

The internal display contributes a dense replacement image for the entire central visual field, not merely an overlay of sparse AR annotations;

Image processing is user- and task-specific, but almost invariably contains some amount of magnification over at least a portion of its extent (implying that a traditional OST-style overlay would not be viable);

The final displayed image is adjusted to appear to blend smoothly into the peripheral areas of vision (formed from light rays of type A and B) where the active display does not extend.

Tailoring the central visual field to suit the user and current task leverages a hallmark capability of the VST paradigm—absolute control over the finest details of the retinal image—to provide flexible customization and utility where it is most needed. Whereas traditional OST AR produces displayed images that neatly coexist and integrate with the natural scene that they overlay, low-vision and HST AR must apply carefully-selected and painstakingly-tuned nonlinear distortions to satisfy their users. Even though the underlying platform is fundamentally OST, careful blending restores a naturally wide field-of-view for a seamless user experience despite the narrow active display region.

Elimination of Focus Ambiguity.

For sections of the field-of-view that coincide with the projected internal display (i.e., the same sections viewing the replacement image), the direct optical light path from the scene to the retina is blocked in HST. This can be accomplished by occluding the scene-facing portion of the half-silvered mirror in the optical combiner. (Analogous procedures for blocking this light will be obvious in other configurations.) It is important to note that only the portion of the combiner having an image from the internal display projected onto it (gray shading in FIGS. 3A-3B) should be blocked, because the surrounding region can contribute significant peripheral vision (particularly at the top, between the upper edge of the internally-generated image and the upper frame of the eyewear).

The rationale behind this non-obvious modification to the standard OST AR configuration is developed immediately below.

Recall that traditional AR operations in the OST regime allow light from the scene to travel directly to the retina and form a natural image there; the internal display can then be used to overpower this natural image so that augmentations are visible to the user. In this low-vision application, it is desirable to overpower the entire scene (within the active display limits) with an enhanced (and generally magnified) replacement.

Typical OST AR hardware is easily capable of producing a bright enough image to overwhelm the natural scene image under practical lighting conditions. For users with normal vision, this is a perfectly reasonable operating mode, and HST as described above is viable without blocking type C light from reaching the retina. For some low-vision users, unfortunately, this does not hold true.

To understand why, consider the task of reading a book while using OST glasses without any additional magnification and without blocking any direct light path. Normal reading distance without AR gear is 16-24 inches and requires accommodation of the lens within the eye to focus a legible image on the retina. The output from the internal display on AR glasses is typically collimated to appear to be originating from a distance of 8-10 feet, allowing the eyes to relax and avoid eyestrain. Without blocking the direct light path, there will be two superimposed images formed on the OST AR user's retina—the natural image focused in the near field, and the display image focused in the far field.

Users with normal vision can readily select between the two nearly identical images, shifting focus at will. In test sessions, however, low-vision users exhibited poorer reading ability even when camera images clearly exhibited increased contrast: they were not able to detect and exploit the contrast cues that normally-sighted individuals use to drive their focus response to completion, and hence were not able to focus successfully on either competing image.

Blocking the direct path that coincides with the internal display alleviates this problem.

What is claimed is:

1. A method of providing visual-assistance for a low-vision user, comprising:
    capturing images of a scene with a camera mounted on an eyeglass system;
    modifying the images with an integrated processor of the eyeglass system to produce corrected images of the scene;
    presenting the corrected images of the scene to an eye of the low-vision user on one or more displays of the eyeglass system;
    blocking an external central light path that coincides with the one or more displays so that a central visual field of the low-vision user comprises only the corrected images of the scene on the one or more displays; and
    while blocking the external central light path, simultaneously allowing an external peripheral light path that passes between an edge of the one or more displays and a frame of the eyeglass system and is not blocked by the one or more displays to reach the eye of the low-vision user to preserve the low-vision user's existing peripheral vision of the scene.

2. The method of claim 1, wherein modifying the images further comprises modifying a magnification of the images.

3. The method of claim 1, wherein modifying the images further comprises modifying an amount of magnification over at least a portion of the images.

4. The method of claim 1, wherein modifying the images further comprises modifying a contrast of the images.

5. The method of claim 1, wherein blocking the external central light path further comprises blocking the external central light path that coincides with the one or more displays with an opaque lens cover.

6. The method of claim 1, further comprising adjusting the corrected images to blend smoothly from the central visual field of the low-vision user into the peripheral vision of the low-vision user.

7. A method of providing visual-assistance for a low-vision user, comprising:
    capturing images of a scene with a camera mounted on an eyeglass system;
    modifying the images with an integrated processor of the eyeglass system to produce corrected images of the scene;
    presenting the corrected images of the scene to an eye of the low-vision user on one or more displays of the eyeglass system;
    blocking an external central light path that coincides with the one or more displays so that a central visual field of the low-vision user comprises only the corrected images of the scene on the one or more displays; and
    while blocking the external central light path, simultaneously allowing an external peripheral light path that is adjacent to the one or more displays and is not blocked by the one or more displays to reach the eye of the low-vision user to preserve the low-vision user's existing peripheral vision of the scene.

8. The method of claim 7, wherein modifying the images further comprises modifying a magnification of the images.

9. The method of claim 7, wherein modifying the images further comprises modifying an amount of magnification over at least a portion of the images.

10. The method of claim 7, wherein modifying the images further comprises modifying a contrast of the images.

11. The method of claim 7, wherein blocking the external central light path further comprises blocking the external central light path that coincides with the one or more displays with an opaque lens cover.

12. The method of claim 7, further comprising adjusting the corrected images to blend smoothly from the central visual field of the low-vision user into the peripheral vision of the low-vision user.

* * * * *